Patented Dec. 27, 1938

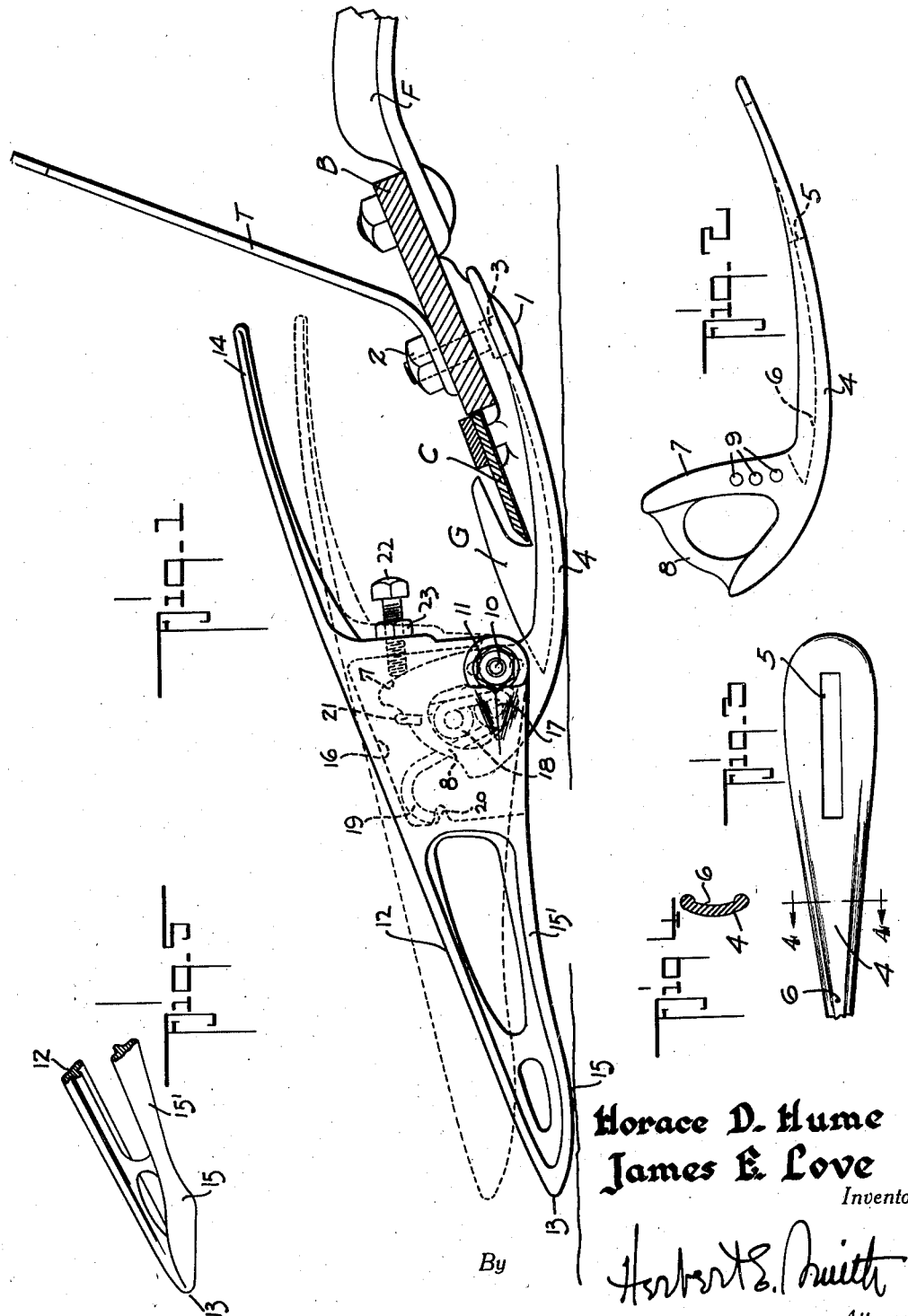

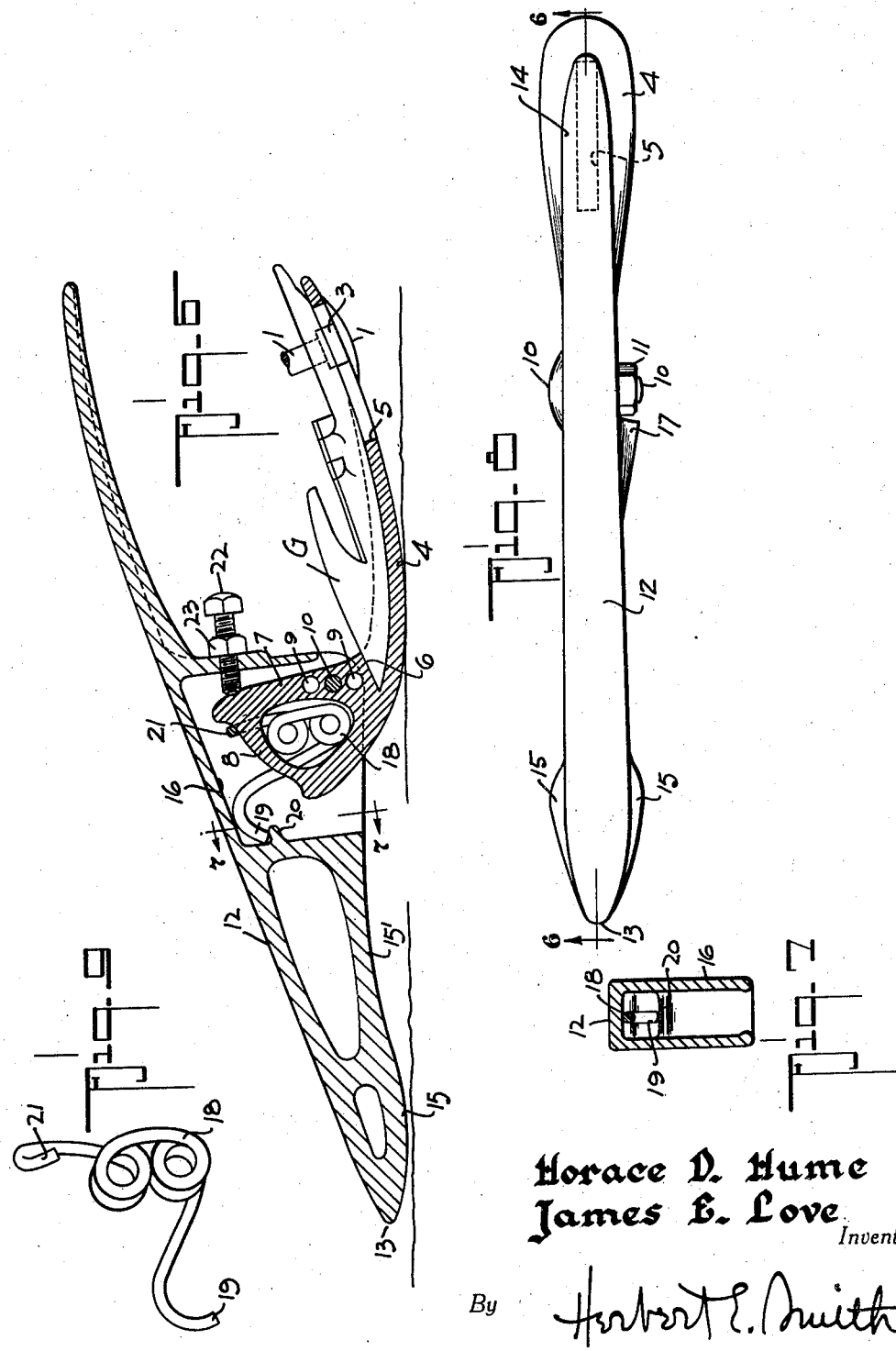

2,141,299

UNITED STATES PATENT OFFICE 2,141,299

CROP LIFTER

Horace D. Hume and James E. Love, Garfield, Wash., assignors to Hume-Love Company, Garfield, Wash., a corporation Application March 4, 1936, Serial No. 66,993

6 Claims. (Cl. 56—312)

Our present invention relates to an improved crop lifter or attachment for grain harvesters, and particularly as an attachment for harvesters of the mower or sickle type employing a front, outwardly set, reciprocating grain cutter. The crop lifter is mounted as an attachment on the cutter frame of the sickle for operation in advance of the transversely extending sickle or cutter, for the purpose of aiding and assisting in guiding and passing the grain or crop rearwardly to the sickle and upwardly to the usual rotary reel and draper found on this type of harvester.

The crop lifter is adapted not only for use in harvesting standing grain, but it is also useful in harvesting down or fallen grain, vines, and other crops that lie close to the ground and are adapted to be harvested by an implement of the reciprocating cutter type.

The crop lifter may be manufactured as an original part of the well known type of reciprocating cutter or sickle, or, as herein illustrated, the appliance is manufactured as a unit that may readily be attached to the mower or harvester without altering the construction or operation of the latter, and when assembled, the attachment provides an auxiliary device that enhances the efficiency of the implement to which it is attached.

The invention consists in certain novel combinations and arrangements of parts as will hereinafter be more fully set forth and claimed. In the accompanying drawings we have illustrated one complete example of the physical embodiment of our invention in connection with a harvesting implement, wherein the parts are combined and arranged according to one mode we have devised for the practical application of the principles of our invention. It will be understood that various changes and alterations may be made in the exemplifying structures, within the scope of our claims, without departing from the principles of our invention.

Figure 1 is a view in side elevation of the crop lifter mounted on the cutter frame in advance of the reciprocating cutter of the harvester, parts of the sickle being shown in section, and the range of movement of the crop lifter being indicated by dotted lines.

Figure 2 is a detail side view of the supporting shoe or runner of the crop lifter.

Figure 3 is a plan view of the rear end of the supporting shoe or runner of the crop lifter.

Figure 4 is a detail cross section at line 4—4 of Figure 3.

Figure 5 is a perspective view at the front end of the crop lifter.

Figure 6 is a detail vertical, longitudinal section at line 6—6 of Figure 8.

Figure 7 is a detail view in cross section at line 7—7 of Figure 6.

Figure 8 is a top plan view of the crop lifter, as a detached unit.

Figure 9 is a perspective view of the detached spring employed with the crop lifter.

In order that the utility of the device, and the general arrangement and relation of parts may readily be understood, we indicated in Figure 1 the reciprocating cutter as C, the well known type of guard G at the outer, free, end of the cutter, the frame bar B and frame F, and a tine T. These are well known devices employed in the sickle type of mower, and it will be understood that a rotary reel, not shown, is usually employed for conveying the grain to the cutter, and that the cut grain passes over the tines T to the usual draper or conveyer operating transversely of the harvesting implement.

The tine T is shown attached to the bar B by means of a bolt 1 and nut 2, and the bolt is preferably formed with an angular or squared shank 3, which bolt rigidly holds the base of the tine to the top of the bar B, rigidly secures the guard G to the bar B, and this bolt is also employed for rigidly attaching the supporting runner or shoe 4 together with the guard G at the underside of the bar B. For this purpose the rear, flat end of the runner or shoe 4 is provided with a longitudinally extending slot 5 through which the squared shank of the bolt 1 projects, and the slot 5 readily provides for adjustment of the supporting shoe or runner in attaching the auxiliary device to the sickle.

In the upper face of the supporting shoe a grooved seat 6 is provided which conforms to the under face of the guard G, and it will readily be seen that the shoe may readily be slipped over the nose of the guard and under its body portion, after which the shoe is rigidly fastened by the bolt 1 to the guard and to the cross bar B.

At its forward end the shoe is fashioned with an upwardly projecting hollow somewhat V-shaped head 7 located in advance of the cutter C and the guard G, and a bridge bar 8 connects the two V-arms of the head.

At the rear side of the head, as best seen in Figure 2, a vertical series of bolt holes 9 pass transversely through the head, one of which may be selected for the pivot bolt 10, which pivotally supports the crop lifter in connection with the nut 11.

The crop lifter is in the nature of a pivoted finger that extends longitudinaly of the implement and projects forwardly in advance of the cutter, and rearwardly over the cutter toward the tine T, the nose of the crop lifter being adapted to slide or ride freely over the ground surface, or to skim lightly thereover, as in Figure 6.

As best seen in Figure 8 the crop lifter is fashioned with a comparatively broad, flat face 12, a pointed nose 13 to skim lightly over the ground, and the upper, flat rear end 14 terminates in a rounded point, so that a swathe of grain may be separated from the field and the grain guided toward the cutter.

The under portion of the nose of the crop lifter is fashioned with rearwardly flaring braces 15 that spread the grain and these braces merge with lower spaced bars or braces 15' that extend rearwardly and merge with the walls of a housing 16 formed at the underside of the crop lifter. This housing fits over and encloses the head 7 of the supporting shoe or runner and the pivot bolt 10 passes through both spaced lateral walls of the housing, an out-spreading guide face 17 being provided on the exterior of the housing wall to prevent grain, vines, etc., from being tangled with the nut 11 of the bolt 10.

It will thus appear that the crop lifter is mounted to pivot or rock on the bearing head of the supporting shoe or runner, and the range of rocking movement is indicated by dotted lines in Figure 1.

It will be understood that the supporting shoe or runner 4 slides over the ground surface and supports both the cutter and the crop lifter, and the latter is adapted to rock on its pivot when an irregularity in the ground surface, or an obstruction, is encountered, to prevent breaking of parts or the imposition of excessive strains.

The front end of the crop lifter is held down to its working positon, and the rear end is held up in its operative position, by means of a spring 18 that is mounted in the bearing head 7 in advance of the pivot bolt. One end 19 of the spring is bent to hook shape, as at 19, and anchored to the crop lifter by means of a transversely extending lug 20 in the housing, and the other end 21 of the spring is hooked to extend transversely over and engage the bridge bar 8 of the bearing head.

The position of the crop lifter may be adjusted to properly locate the nose of the device with relation to the ground, by means of an adjusting screw or bolt 22 threaded through the rear wall of the housing with its inner end bearing against the head 7 of the supporting shoe, and a set nut or locking nut 23 on the bolt is turned into frictional contact with the outer face of the housing wall. When thus adjusted the downward movement of the front end of the crop lifter, under urge of the spring 18, is limited by contact of the bolt with the head 7, but the crop lifter may swing against the tension of the spring, as indicated by dotted lines in Figure 1.

Having thus fully described our invention, what we claim as new and desire to secure by Letters Patent is:—

1. The combination with a supporting shoe having a hollow approximately V-shaped head, of a finger bar having a housing fitted over the head and pivotally supported thereon, a spring mounted in the V-shaped head, means for anchoring the respective ends of the spring to the head and to the housing, and a set bolt mounted in a wall of the housing for engagement with the head.

2. In an attachment for a harvesting machine, the combination with a guard and a frame bar, of a supporting shoe having a slotted end and a bolt for fastening said end to the frame bar, said shoe also having a grooved seat in its upper face for frictional engagement with the guard, an integral bearing head on the front end of the shoe, a finger bar having a housing enclosing the head and pivotally mounted thereon, resilient means between the head and the housing for holding the finger bar in operative position and adjustable means on the housing for engagement with the head to limit downward movement of the front end of the finger bar.

3. The combination with a supporting shoe having a hollow approximately V-shaped head, of a finger bar having a housing fitted over the head and pivotally supported thereon, a spring mounted in the V-shaped head, means for anchoring the respective ends of the spring to the head and to the housing, and adjustable means on the housing for engagement with the head to limit downward movement of the front end of the finger bar.

4. A knife guard for cutting implements comprising, a shank for attachment to the cutter bar of an implement, a shoe provided with a recess for reception of the forward end of said shank, a pivotal connection for said shoe and shank, a spring positioned within said recess between the shoe and shank and urging the free end of the shoe downwardly, and a set screw carried by the shoe and engaging said shank for limiting the downward movement of said shoe.

5. A knife guard for cutting implements comprising, a shank for attachment to the cutter bar of an implement, a shoe provided with a recess for reception of the forward end of said shank, a pintle connecting said shoe and shank, a spring positioned with said recess between the shoe and shank to urge the free end of the shoe downwardly toward the ground, the forward end of said shank being provided with a rounded nose on its lower side to ride over obstructions, and a set screw carried by the shoe for engaging said shank to limit the downward movement of said nose.

6. In combination with a cutter bar of an implement, a knife guard comprising, a shank for attachment to the cutter bar, a shoe provided with a recess for reception of the forward end of said shank, a pivotal connection for said shoe and shank, a spring positioned within said recess between the shoe and shank and urging the free end of the shoe downwardly, a set screw carried by the shoe and engaging said shank for limiting the downward movement of said shoe, and means carried by the shoe and engaging the shank for limiting the upward movement of said shoe.

HORACE D. HUME.
JAMES E. LOVE.